April 17, 1928.

A. E. PEW, JR., ET AL 1,666,302

PROCESS AND APPARATUS FOR DISTILLING MINERAL OIL

Filed Feb. 23, 1924     2 Sheets-Sheet 1

WITNESS:
*Rob't R Kitchel*

INVENTORS
*Arthur E. Pew, Jr. and
Henry Thomas*
BY
*Busser and Harding*
ATTORNEYS.

April 17, 1928.
A. E. PEW, JR., ET AL
1,666,302
PROCESS AND APPARATUS FOR DISTILLING MINERAL OIL
Filed Feb. 23, 1924   2 Sheets-Sheet 2
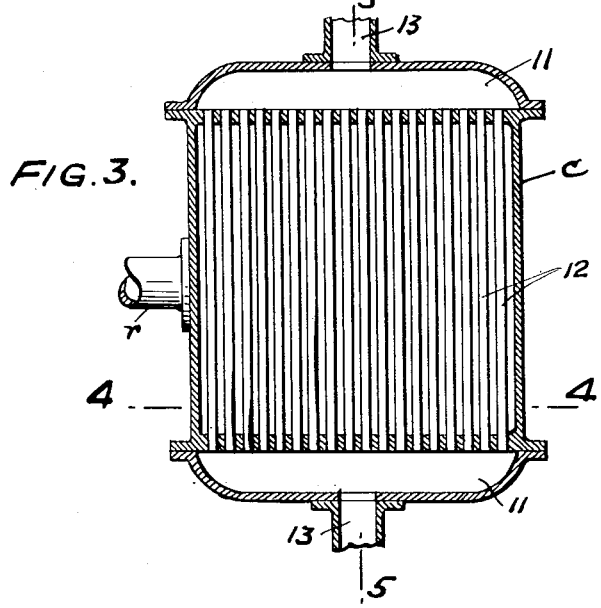
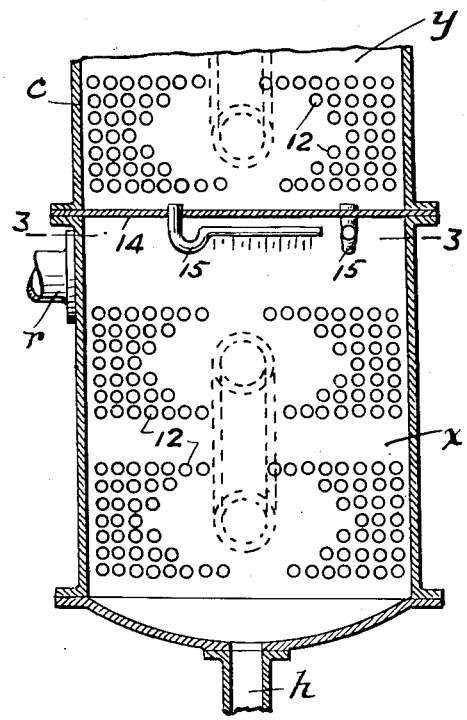
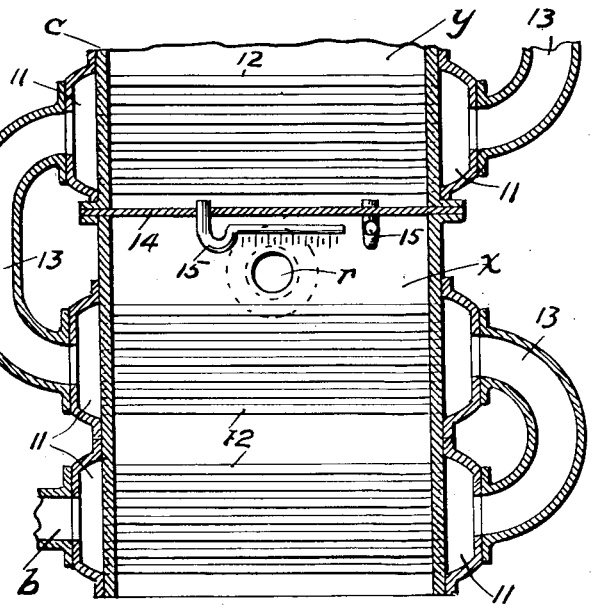
INVENTORS
Arthur E. Pew, Jr. and
Henry Thomas
BY
Busser and Harding
ATTORNEYS.
WITNESS:

Patented Apr. 17, 1928.

1,666,302

UNITED STATES PATENT OFFICE.

ARTHUR E. PEW, JR., OF BRYN MAWR, AND HENRY THOMAS, OF RIDLEY PARK, PENNSYLVANIA, ASSIGNORS TO SUN OIL COMPANY, OF PHILADELPHIA, PENNSYLVANIA, A CORPORATION OF NEW JERSEY.

PROCESS AND APPARATUS FOR DISTILLING MINERAL OIL.

Application filed February 23, 1924. Serial No. 694,473.

Our invention comprises an apparatus and process for distilling mineral oil in which a highly heated flowing stream of oil is brought into heat exchange relation, while maintained out of physical contact, with a wholly independent stream of oil, in such manner as to effect fractional distillation of the oil in one of the flowing streams.

Preferred forms of the apparatus are shown in the drawings, in which—

Fig. 3 is a horizontal section through the vaporizing fractional distilling unit, on the line 3—3 of Fig. 4.

Fig. 4 is a vertical section on the line 4—4 of Fig. 3.

Fig. 5 is a vertical section on the line 5—5 of Fig. 3.

From a heater $a$ (which may be a still) a heavy heat resistant oil is pumped through line $b$, through the tubes of the vaporizer $c$ (hereinafter specifically described) and thence back through line $d$ to the heater $a$. The oil continues to be pumped repeatedly through the same closed circuit. A high velocity is maintained throughout the system. At $e$ fresh oil is added, from time to time, as may be necessary, to replace loss. Cold oil to be distilled is pumped through line $f$ (in which is interposed a heat exchanger $g$) and admitted into the upper part of the vaporizer $c$, down within which and over the tubes whereof it flows, vapors being distilled off and the residual oil flowing out through line $h$ and the heat exchanger $g$ to storage or to other fractionating units.

Figure 1:
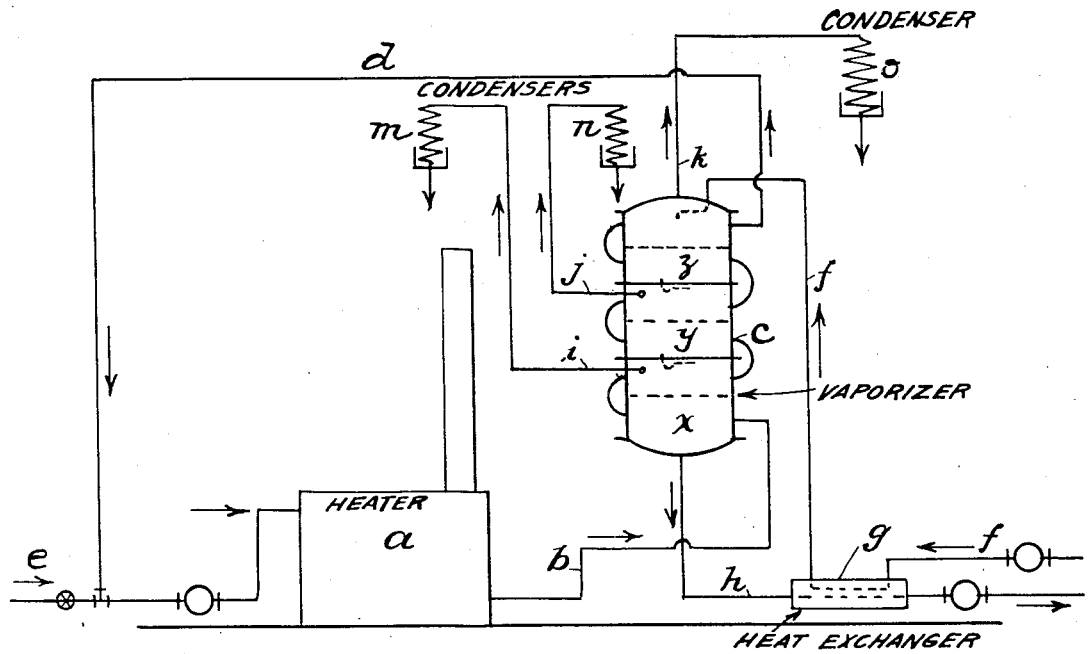
Fig. 1 is a diagram of one form of apparatus.

Referring specifically to Fig. 1: $i$, $j$, $k$ are manifolds through which evolved vapors are led to condensers $m$, $n$, $o$, respectively.

Figure 2:
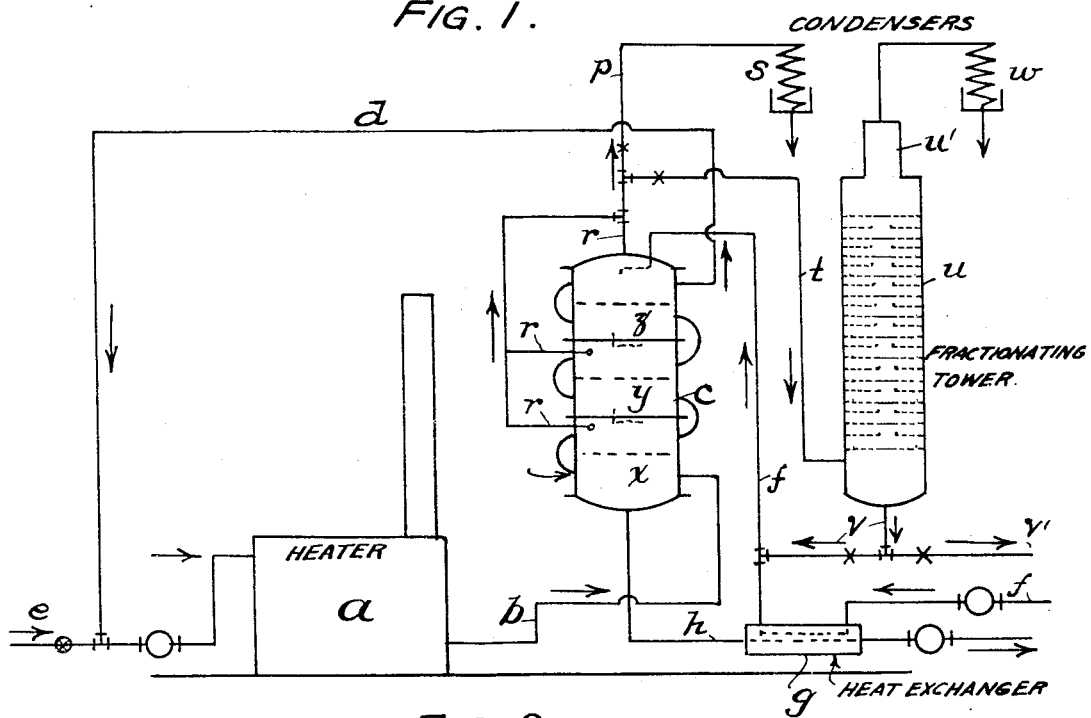
Fig. 2 is a diagram of a modified form of apparatus.

Referring specifically to Fig. 2: $r$, $r$, $r$, are manifolds through which evolved vapors are led, through pipe $p$, to a condenser $s$, or through line $t$ to a fractionating tower $u$. By line $v$ the condensate from this tower returns to line $f$ and thence to vaporizer $c$, or may go by branch line $v'$ to storage; the uncondensed vapors passing from the tower to a condenser $w$.

Referring to Figs. 3, 4 and 5, wherein the vaporizing fractional distilling unit $c$ is shown in detail: The interior of the casing $c$ is divided, by horizontal partitions 14, into as many compartments, or vaporizing sections, as may be desired. Three sections, $x$, $y$ and $z$, are shown. Any number of sections may be provided. At opposite sides of the casing are headers 11. Connecting opposite headers 11 are tubes 12. Connecting one of the lower headers 11 on section $x$ with the upper header 11 on the same side of section $x$ is a curved tube 13. A similar curved tube 13 connects the other upper header 11 on section $x$ with the lower header on the same side of section $y$. Similar curved tubes 13 connect other adjacent headers. Each of the horizontal partitions 14 carries a number of pipes 15 adapted to receive unvaporized oil from the compartment above it and convey such oil into the compartment below it; the section of the pipe below the partition 14 extending horizontally and orificed along its length to effect the desired distribution of the oil.

The heated oil from pipe $b$ enters a lower header 11 of the lower vaporizer section $x$ and thence flows through a set of tubes 12 into the other lower header of section $x$, thence through a curved tube 13 into the adjacent upper header of section $x$, thence successively through the remaining sets of tubes and headers in the staggered path shown in Fig. 5 and finally into the pipe $d$ at the top of the vaporizer, and thence back to heater $a$, from there repeating the cycle, as above described.

Cold oil flowing through line $f$, and heated during its flow therethrough in the exchanger $g$, is admitted into the top of section $z$ of the vaporizer $c$. Vapors generated therein are led off through manifold $k$, Fig. 1, or through the upper of the three manifolds $r$, Fig. 2. Unvaporized oil flows out of section $z$ through pipes 15 and passes down over the tubes in section $y$, wherein more vapors are generated and outflow through the corresponding manifold. Unvaporized oil from section $y$ discharges through pipes 15 and flows down over the tubes in section $x$, wherein still more vapors are generated and escape through the corresponding manifold.

The oil entering the top of the vaporizer is heated only to the extent that it has absorbed heat from the exchanger $g$ and is very much lower in temperature than the oil pumped from the heater. Hence there is an exchange of heat between the two streams of oil as one stream flows through the tubes and headers in a general upward direction and the other drops down over the tubes, until at the top the difference in temperature between the two streams of oil is relatively slight. In the downward flow of the oil to be distilled, it spreads over the outside surfaces of the tubes 12 in a thin layer or film, and by transfer of heat from the hotter oil flowing through the inside of the tubes, the conditions are favorable to complete distillation of any fraction that, at any given point of flow, is heated to its boiling temperature. Inasmuch as the temperature within the vaporizer progressively falls from the bottom toward the top, only the lightest fractions are vaporized in section $z$, while progressively heavier fractions are vaporized in sections $y$ and $x$. It will be understood that as many sections ($x$, $y$ and $z$) may be provided as may be found to be desirable.

The residual oil flowing out through pipe $h$ passes through the exchanger $g$ and serves to heat the incoming fresh oil, as above-stated.

In Fig. 1, the several vaporized fractions go to separate condenser $m$, $n$, $o$.

In Fig. 2, the vapors from all the manifolds may go to a common condenser $s$, or they may be led off through vapor line $t$ into the bottom of a fractionating tower $u$. This fractionating tower may be of any suitable construction, but it is preferred to construct it in accordance with the tower illustrated in Fig. 2 of our application filed of even date herewith, Serial No. 694,470. The vapors rise through this tower to a reflux condenser $u'$, which returns the heavier fractions and passes the lighter to a condenser $w$. The condensate from the tower is conveyed, through pipe $v$, to line $f$, and re-enters the vaporizer $c$ with fresh oil; or it may be run to storage through branch pipe $v'$.

Throughout that part of the system exclusive of the heater and its endless pipe circuit, the pressure may be regulated, if desired, by known means, to maintain any predetermined absolute pressure, from superatmospheric to a high degree of vacuum. The system is especially applicable to vacuum distillation, and it is preferred to use a high degree of vacuum, varying from an absolute pressure not exceeding twenty-five millimeters mercury down to as near zero pressure as is practicable.

Having now fully described our invention, what we claim and desire to protect by Letters Patent is:

1. A fractional distilling apparatus of the character specified comprising a casing, sets of tubes within the casing arranged at different elevations, each set comprising a multitude of tubes extending alongside one another and at different levels, an oil heater, means adapted to convey a stream of oil from the heater and distribute the oil to the tubes of the lowest set, means adapted to convey oil that has passed through the tubes of one set and distribute the oil through the tubes of a higher set, a partition separating two adjacent sets of tubes at different levels, means to convey an independent stream of oil to the upper part of the interior of the casing and means to allow such independent stream of oil to flow through said partition, whereby the oil in the second stream will flow by gravity down over the several sets of tubes at progressively lower elevations and through said partition to effect vaporization of progressively higher boiling fractions of the oil in the second stream, said casing having outlets above and below said partition to allow the separate escape of such progressively higher boiling fractions.

2. The process of separating from mineral oil lower boiling point distillates thereof which comprises heating a mineral oil and circulating the same through a series of confined spaces at progressively higher elevations, dividing the oil flowing through each of said confined spaces into a multitude of confined paths, and flowing an independent stream of oil to be vaporized into the uppermost space and allowing it to descend by gravity within said space into heat exchange relation, but out of contact, with the first mentioned oil flowing through the multitude of confined paths therein, then flowing the oil of the second stream in a similar manner through the other space or spaces below the uppermost space, thereby vaporizing progressively higher boiling point fractions of the oil in the second stream, and separately outflowing the vapors from the several confined spaces.

3. The process of vaporizing mineral oil which comprises heating a mineral oil to a distilling temperature of the oil to be vaporized and flowing a stream of said hot oil within a still at successively higher elevations and dividing the hot oil flowing at each elevation into confined, multiple, spaced apart streams, flowing an independent stream of mineral oil to be vaporized into the upper part of the still and so disseminating it that it passes into heat exchange relation, but out of contact, with said hot oil streams and distributes itself in thin films in heat exchange relation with successively lower oil streams and with progressively hotter multiple oil streams at successively lower elevations so as to produce an intensive heating action and progressive fractional vaporization as well as the substantially complete vaporization of fractions having boiling points below the progressively rising temperatures to which the downflowing distributed and disseminated oil is subjected, and reheating the cooled oil of the first stream after it flows out of heat exchange relation with the oil of the second stream and recirculating it as hereinbefore specified.

4. The process set forth in claim 3 where- in the vaporizing space within the still is maintained under a vacuum.

In testimony of which invention, we have hereunto set our hands, at Philadelphia, Pa., on this 14th day of February, 1924.

ARTHUR E. PEW, Jr.
HENRY THOMAS.